United States Patent
Park

(10) Patent No.: US 8,897,703 B2
(45) Date of Patent: *Nov. 25, 2014

(54) BLUETOOTH DEVICE AND METHOD OF SEARCHING FOR PERIPHERAL BLUETOOTH DEVICE

(75) Inventor: Sang Wook Park, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 799 days.

This patent is subject to a terminal disclaimer.

(21) Appl. No.: 12/546,116

(22) Filed: Aug. 24, 2009

(65) Prior Publication Data

US 2010/0062711 A1 Mar. 11, 2010

(30) Foreign Application Priority Data

Sep. 8, 2008 (KR) .................. 10-2008-0088442

(51) Int. Cl.
*H04B 7/00* (2006.01)
*H04W 8/00* (2009.01)

(52) U.S. Cl.
CPC ..................... *H04W 8/005* (2013.01)
USPC ....................................................... 455/41.2

(58) Field of Classification Search
CPC ..................................................... H04W 8/005
USPC ....................................................... 455/41.2
See application file for complete search history.

(56) References Cited

U.S. PATENT DOCUMENTS

| | | | | |
|---|---|---|---|---|
| 6,961,541 B2 * | 11/2005 | Overy et al. | ............... | 455/41.2 |
| 7,403,793 B2 * | 7/2008 | Mauney et al. | ............... | 455/41.2 |
| 8,521,235 B2 * | 8/2013 | Nixon et al. | ............... | 455/569.2 |
| 2005/0164637 A1 * | 7/2005 | Pattabiraman et al. | ...... | 455/41.2 |
| 2006/0084381 A1 * | 4/2006 | Hartwig | ............... | 455/41.2 |
| 2007/0105500 A1 * | 5/2007 | Kim | ............... | 455/41.2 |
| 2011/0171908 A1 * | 7/2011 | Hua | ............... | 455/41.2 |
| 2012/0171961 A1 * | 7/2012 | Qi et al. | ............... | 455/41.2 |

* cited by examiner

*Primary Examiner* — David Bilodeau
(74) *Attorney, Agent, or Firm* — Cha & Reiter, LLC

(57) ABSTRACT

A Bluetooth device and a method of searching for a peripheral Bluetooth device using a previous search results are provided. The method of searching for a peripheral Bluetooth device includes: acquiring, if input instructing the start of an initial search is received, initial search address information and initial search device information about at least one peripheral Bluetooth device in a preset period; storing the acquired initial search address information and initial search device information in a storage unit; acquiring, if a request for searching for a peripheral device for performing Bluetooth communication is input, address information of a found peripheral Bluetooth device; determining whether address information corresponding to the acquired address information of the found peripheral Bluetooth device exists in the storage unit; and notifying a user, if address information corresponding to the acquired address information of the found peripheral Bluetooth device exists in the storage unit, of the stored initial search device information of the found peripheral device corresponding to the address information.

21 Claims, 4 Drawing Sheets

BLUETOOTH DEVICE AND METHOD OF SEARCHING FOR PERIPHERAL BLUETOOTH DEVICE

CLAIM OF PRIORITY

This application claims the benefit of the earlier filing date, pursuant to 35 USC §119, to that patent an application entitled "BLUETOOTH DEVICE AND METHOD OF SEARCHING FOR PERIPHERAL BLUETOOTH DEVICE" filed in the Korean Intellectual Property Office on Sep. 8, 2008 and assigned Serial No. 10-2008-0088442, the contents of which are incorporated herein by reference.

BACKGROUND OF THE INVENTION

1. Field of the Invention

The present invention relates to Bluetooth communication, and more particularly, to a Bluetooth device and a method of searching for a peripheral Bluetooth device using a previous search.

2. Description of the Related Art

With the development of a technology related to wireless communication, interest has increased in a technology using a wireless device or a wireless link having a low cost and low electric power requirement. Bluetooth is a well known wireless communication method using on a short range wireless technology. Bluetooth operates in the industrial, scientific, and medical (hereinafter, ISM) 2.4 GHz frequency band and can transmit voice and data with a maximum speed of 1 Mbps (Mega Bits per Sec) within a radial distance in the order of 10 meters. A Bluetooth communication module is widely used because of the very low power consumption.

In order to perform Bluetooth communication, a Bluetooth device searches for a peripheral Bluetooth device existing within a predetermined area of the device. After a process of searching for a peripheral Bluetooth device, the searching Bluetooth device performs Bluetooth communication with a found peripheral Bluetooth device through a well-known connection process. The process of searching for a peripheral Bluetooth device existing within a predetermined area in order to perform Bluetooth communication is called an inquiry process. In general, a Bluetooth device searching for a peripheral Bluetooth device in an inquiry process broadcasts an inquiry message for searching for a peripheral Bluetooth device while hopping among the currently known 79 radio frequency channels set to perform Bluetooth communication. A peripheral Bluetooth device that has changed from a standby state to a wake-up state receives the inquiry message while scanning channels and transmits a response message to the Bluetooth device that transmitted the inquiry message. The searching Bluetooth device receives the response messages from the peripheral Bluetooth devices and thus obtains information regarding of the detected peripheral Bluetooth devices. Because each of the peripheral Bluetooth devices is changed to a wake up state by an intrinsic clock that is not synchronized with the Bluetooth device searching for the peripheral Bluetooth devices, the peripheral Bluetooth devices scan known 79 channels at different time points. Therefore, because peripheral Bluetooth devices do not scan channels until their states change to a wake up state, after the time point at which a Bluetooth device searching for the peripheral Bluetooth devices transmits an inquiry message, much time is required for the searching Bluetooth device to receive response messages from the peripheral Bluetooth devices. Therefore, because the required time for performing the initialization of the Bluetooth communication between the search and the detecting devices there is a long delay to establish communications that creates an inconvenience to a user, a demand exists for a method of rapidly searching for peripheral Bluetooth devices in order to improve the communication synchronization between a searching and a detected device.

SUMMARY OF THE INVENTION

The present invention provides a Bluetooth device and a method of searching for a peripheral Bluetooth device using a previous search.

In accordance with an aspect of the present invention, a method of searching for a peripheral Bluetooth device includes: acquiring, if input instructing the start of an initial search is received, initial search address information and initial search device information about at least one peripheral Bluetooth device through preset channels in a preset period; storing the acquired initial search address information and initial search device information in a storage unit; acquiring, if a request for searching for a peripheral device is input, address information of a found peripheral device through the preset channels; determining whether address information corresponding to the acquired address information of the found peripheral device exists in the storage unit; and notifying a user, if address information corresponding to the acquired address information of the found peripheral device exists in the storage unit, of the stored initial search device information of the found peripheral device corresponding to the address information.

In one aspect, the method further includes: acquiring device information of a found peripheral device corresponding to address information among the newly acquired address information that does not exist in the storage unit; and notifying a user of the acquired device information of at least one peripheral device that does not exist in the storage unit.

In one aspect, acquiring initial search address information and initial search device information includes: determining, if input instructing the start of an initial search is received, a present position of the peripheral Bluetooth device using position information; comparing the determined present position with a previous position that is previously determined and stored; and acquiring, if the difference between the present position and the previous position is equal to or greater than a critical value, initial search address information and initial search device information about at least one peripheral device through the preset channels.

In accordance with another aspect of the present invention, a device includes: a Bluetooth module for transmitting and receiving signals for acquiring address information and device information of at least one peripheral device through preset channels; a storage unit for storing the acquired address information and device information; and a controller for acquiring, if input instructing the start of an initial search is received, initial search address information and initial search device information of at least one peripheral device in a preset period, acquiring, if a request for searching for a peripheral device for performing Bluetooth communication is input, address information of a found peripheral device, determining whether address information corresponding to the newly acquired address information exists in the storage unit, and notifying a user, if address information corresponding to the newly acquired address information exists in the storage unit, of device information of the at least one peripheral device corresponding to the address information.

In one aspect, the controller acquires device information of a found peripheral device corresponding to address information among the newly acquired address information that does not exist in the storage unit, and notifies a user of the acquired device information.

In one aspect, the device further includes a position information module for receiving position information.

In one aspect, the controller determines, if input instructing the start of an initial search is received, a present position of the device using position information received through the position information module, compares the determined present position with a previous position that is previously determined and stored, and acquires, if the difference between the present position and the previous position is equal to or greater than a critical value, initial search address information and initial search device information about at least one peripheral Bluetooth device through the preset channels.

In one aspect, the device further includes an input unit for receiving input instructing the start of an initial search and for receiving input of a request for searching for the peripheral device.

In one aspect, the storage unit updates previously stored address information and device information of the corresponding peripheral device with the address information and device information acquired in the preset period.

In one aspect, the device further includes a display unit for displaying device information of a found peripheral device corresponding to the acquired address information in order to notify a user.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Figure 1:
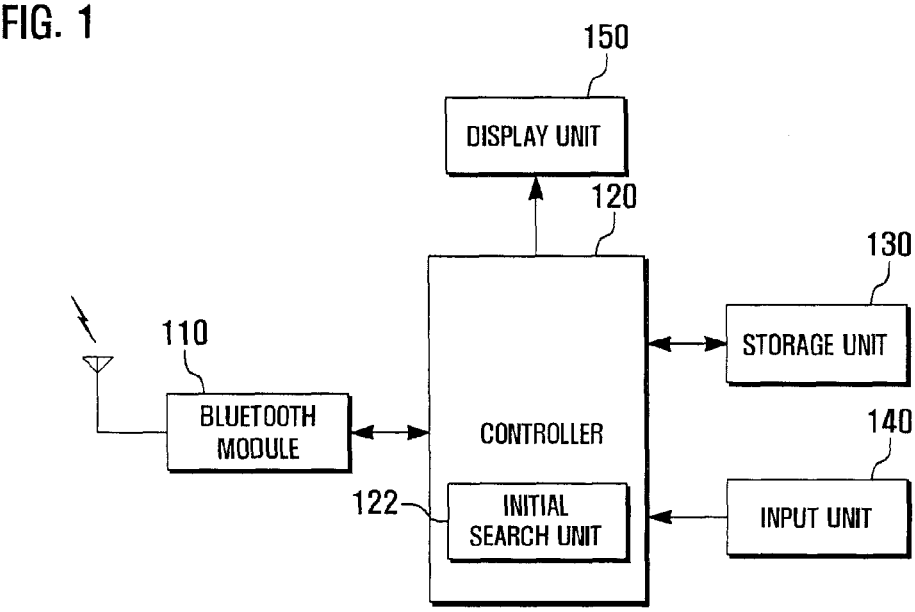
FIG. 1 is a block diagram illustrating a configuration of a device including a Bluetooth module according to an embodiment of the present invention.

FIG. 1 is a block diagram illustrating a configuration of a device containing a Bluetooth module (hereinafter referred to as a Bluetooth device) according to an exemplary embodiment of the present invention.

In the present exemplary embodiment, the Bluetooth device includes a Bluetooth module for transmitting and receiving a signal according to a Bluetooth communication protocol. The device is also capable of initiating a procedure, through the Bluetooth module for searching for a peripheral Bluetooth device.

Referring to FIG. 1, the Bluetooth device includes a Bluetooth module 110, controller 120, storage unit 130, input unit 140, and display unit 150.

The Bluetooth module 110 performs Bluetooth communication by transmitting and receiving signals to and from another Bluetooth device. Particularly, when a request for searching for a peripheral device is input according to the present embodiment, the Bluetooth module 110 broadcasts an inquiry message through a plurality of preset radio frequency hopping channels that have been assigned for performing Bluetooth communication and transmits a device name request message. In response, the Bluetooth module 110 receives a response message of the inquiry message (hereinafter, an 'inquiry response message') transmitted from each of the peripheral devices that received the inquiry message and a response message of the device name request message (hereinafter, a 'device name response message') therefrom.

The controller 120 controls general operations of the device. Further, the controller 120 includes an initial search unit 122, and when a preset input for performing an initial search of a peripheral device is received by the controller, such as when power is applied to the Bluetooth device, or when a request for activating the Bluetooth module 110 is input, the controller 120 controls the initial search unit 122 to perform operations for searching for peripheral devices and to store information about the found peripheral device in the storage unit 130. The process of performing an initial search is described in detail later with reference to FIG. 2.

The storage unit 130 stores various programs and data to be executed and processed by the control of the controller 120. Further, the storage unit 130 stores previously acquired information about peripheral devices according to the present exemplary embodiment.

The input unit 140 is used for inputting a user's manipulation signal for controlling operation of the Bluetooth device. The input unit 140 may have a plurality of keys (not shown) for performing an input operation.

The display unit 150 visually displays various information related to a state and operation of the Bluetooth device, and any peripheral devices that may be detected. For example, in the present exemplary embodiment, the display unit 150 displays information about a peripheral device acquired in a process of searching for peripheral devices. In the present exemplary embodiment, the input unit 140 and the display unit 150 are separately provided, however it would be recognized by those skilled in the art that the input unit 140 and the display unit 150 may be provided integrally in one device, for example a touch screen.

Figure 2:
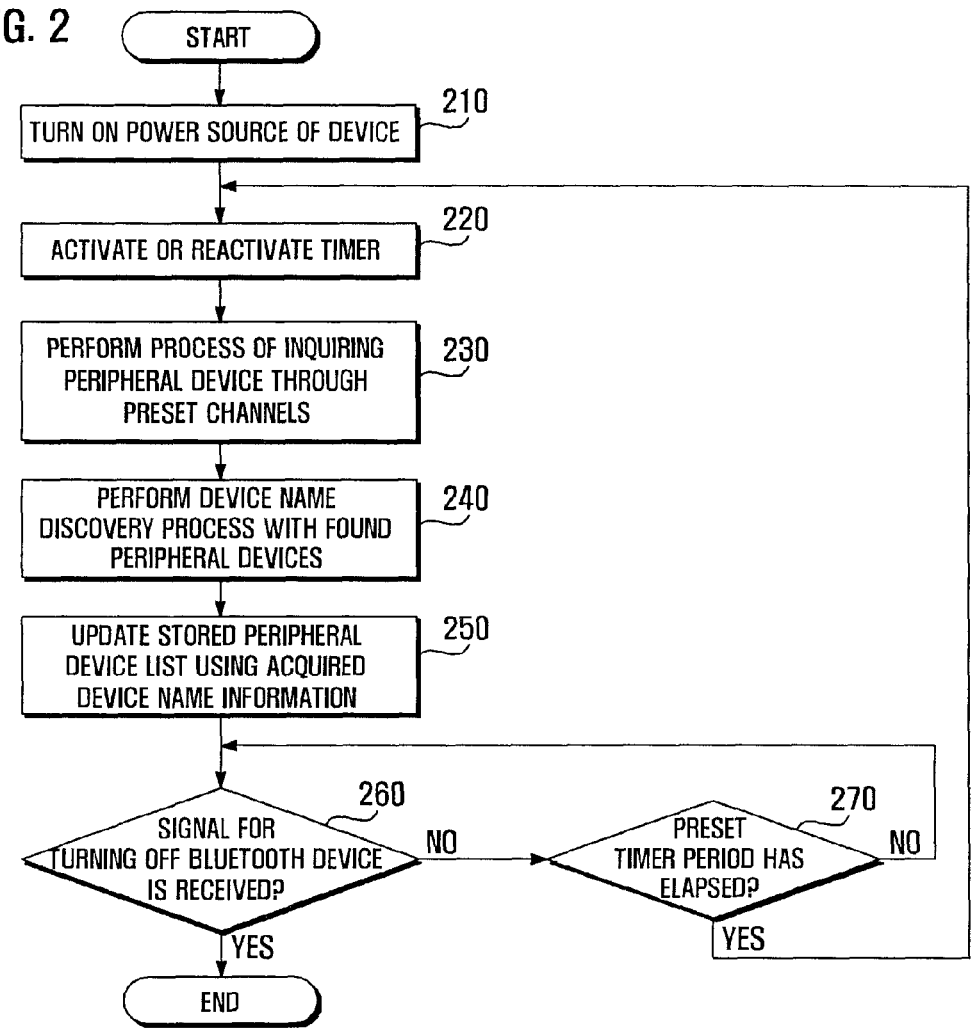
FIG. 2 is a flowchart illustrating a process for performing an initial search for peripheral devices according to an embodiment of the present invention.

FIG. 2 is a flowchart illustrating a process of performing an initial search for peripheral devices according to an embodiment of the present invention.

Referring to FIG. 2, the initial search unit 122 of the controller 120 determines that a power source of a device is turned on, i.e. that power is applied to the device (210).

FIG. 2 illustrates a process of performing an initial search in a preset period from a time point at which power is applied to a device. However, in order to save power consumption of the Bluetooth device, in another aspect of the invention, the initial search may only be performed when a preset input, such as input for activating the Bluetooth module 110 to perform an initial search for a peripheral device, is performed.

The initial search unit 122 activates or reactivates a timer that is activated for a preset time period in order to measure an initial search period (220).

The initial search unit 122 performs a process of inquiring peripheral devices available for Bluetooth communication through a plurality of preset frequency hopping channels (230).

The process of inquiring peripheral devices includes a process of broadcasting an inquiry message and a process of receiving a response message to the inquiry message. Specifically, a Bluetooth device (hereinafter, may be referred to as a 'master device') for searching for peripheral devices broadcasts an inquiry message through each of a plurality of channels, which are frequency hopping within a known wireless frequency band. For example, the band may be represented as industrial, scientific, and medical (hereinafter, 'ISM') 2.4 GHz wireless frequency band that is set to perform Bluetooth communication. In the ISM frequency band, the quantity of preset channels is set to, for example, 79. Peripheral devices (hereinafter, which may be referred to as a 'slave device') that have been in a standby state are changed to a wake up state for a predetermined period and determine whether an inquiry message for searching for a peripheral device is broadcast by scanning the preset channels. Here, the predetermined period is a value preset as a time interval in which a state of the slave devices is changed from a standby state to a wake up state and radio frequency channels are scanned in order to determine whether an inquiry message for searching for a peripheral device had been transmitted by a master device. In one well known aspect of Bluetooth communications, the preset value may be set to 1.28 seconds. If the slave device receives an inquiry message after scanning the preset channels after being in the wake up state, the slave device transmits a response message to the received inquiry message to the master device that transmitted the inquiry message. In this case, the inquiry response message includes information that the the master device utilizes for performing a paging process with the slave device. For example, a device address and clock information of the transmitting slave device may be provided in the response message. The master device then acquires address information of the slave devices, i.e. the peripheral devices, through the response message in accordance with the described inquiry process.

The initial search unit 122 performs a name discovery process with the peripheral devices that transmitted an inquiry response message (240). The name discovery process includes a process of transmitting a message requesting peripheral device information and a process of receiving a response message including the peripheral device information. Specifically, the master device transmits a remote name request message to a slave device from which an inquiry response message was received after a search process, and the slave device, upon receiving the remote name request message, transmits a remote name response message including device information of the slave device to the master device.

In this case, the remote name response message may include information about the slave device, such as a peripheral device name and support service information. In this way, by performing a process of acquiring a device name with peripheral devices, the initial search unit 122 acquires a device name and support service information of peripheral devices existing in a periphery of the Bluetooth device.

Device name information can be set upon manufacturing of the device, or by a user as a name of the peripheral Bluetooth device. Support service information is information about a service that can be supported by the peripheral device, and includes information about which services are supported (e.g., headset communication, printing, and transmission and reception of a still picture file, moving picture file, or music file).

For convenience of description of the invention, a process of determining whether address information of peripheral devices acquired through an inquiry process already exists in a stored list prior to performing step 240 is omitted. However such a process may be performed. If such a process is performed, the device name discovery process of step 240 is performed only with peripheral devices in which address information does not exist in the stored list.

The initial search unit 122 stores information about peripheral devices in a peripheral device list using the acquired device information (250). Whenever an initial search is periodically performed by the initial search unit 122, the stored peripheral device list is updated. That is, device information previously stored in the storage unit is updated by device information acquired after an initial search is performed. After an initial search of a peripheral device is performed, information about peripheral devices stored in the peripheral device list can be easily updated according to various situations, such as movement of the master device or the slave device or termination of Bluetooth communication between a master and a slave device. Therefore, in order to sustain a peripheral device list having high reliability, the initial search unit 122 compares information of the peripheral device acquired by an initial search with previously stored information of the peripheral device in the peripheral device list and updates the information of the peripheral device. However, instead of updating the information of the peripheral device whenever an initial search of the peripheral device is performed, the information may be updated only after the expiration of a predetermined time period, or only received information is determined to be critical information according to a preset criterion value(s). Further, when no new device information is acquired from a peripheral device, the corresponding device information may be deleted from the peripheral device list stored in the storage unit 130.

The initial search unit 122 determines whether a signal for turning off the Bluetooth device is received (260). If a signal for turning off the Bluetooth device is received, the initial search unit 122 terminates the initial search of the peripheral device. If a signal for turning off the Bluetooth device is not received, the initial search unit 122 determines whether a preset timer period measured by the timer has elapsed (270). Here, an initial search of the peripheral device is started when power of the Bluetooth device is turned on at step 210 and periodically performed thereafter, until turning off a power source of the Bluetooth device is determined. However, when the start of an initial search of the peripheral device is activated by a differently set function (e.g., user initiated), the initial search is periodically performed until turning off of a setting function is determined. For example, when an initial search of the peripheral device starts by input for turning on Bluetooth module driving, the initial search unit 122 determines whether input for turning off Bluetooth module driving is received.

If the preset time period has elapsed, the process returns to step 220 and the timer is reactivated. If the preset time period has not elapsed, the process returns to step 260.

Figure 3:
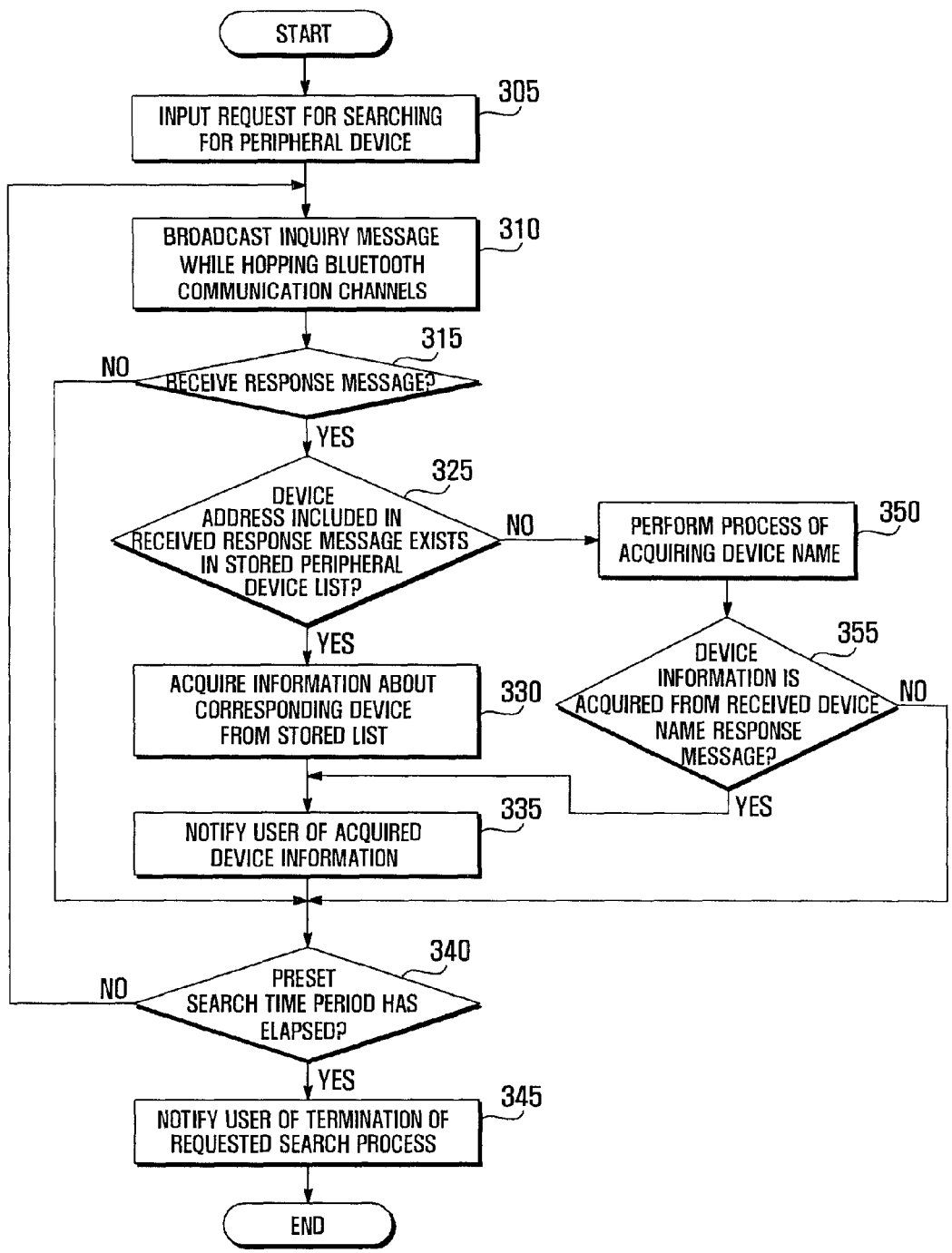
FIG. 3 is a flowchart illustrating a process of searching for a peripheral device according to another embodiment of the present invention.

FIG. 3 is a flowchart illustrating a process of searching for a peripheral device according to an embodiment of the present invention.

Referring to FIG. 3, when a request for searching for a peripheral device is input by key input from a user (305), the controller 120 of FIG. 1 broadcasts an inquiry message according to the Bluetooth communication protocol (310).

Here, the Bluetooth communication channels are, for example, 79 channels with preset frequency bands, for example, a 2.4 GHz frequency band for Bluetooth communication, as described with reference to FIG. 2.

The controller 120 determines whether a response message of the broadcast inquiry message is received (315). If a response message of the broadcast inquiry message is received, the controller 120 determines whether a device address included in the received response message exists in a peripheral device list stored in the storage unit 130 (325).

If a device address included in the received response message exists in the stored peripheral device list, the controller 120 acquires information about the corresponding peripheral device from the stored peripheral device list (330). The acquired device information may be a device name and a support service. The controller 120 notifies the user of the acquired device information (335). A method of notifying a user of the acquired device information may be one of various methods, such as displaying information in a display unit, generating sound through a speaker, and transmitting information to another peripheral device. In the description of the present embodiment of the invention and merely, for convenience of description, the method of displaying in the display unit 150 is used, wherein the device information that is previously searched and stored is displayed in the display unit 150. In addition when device information that is not stored in the storage unit 130 is acquired through a device name discovery process with the corresponding peripheral device, the newly acquired device information is displayed in the display unit 150. For example, in a Bluetooth device that is set to display information about 20 peripheral devices, when information about 10 peripheral devices is acquired and stored through an inquiry process, the stored device information is displayed in the display unit 150, and with respect to the remaining peripheral devices, device information acquired through a device name discovery process is displayed in the display unit 150. In this example, in which information about a half of the peripheral devices is acquired and stored through an inquiry process, after a request for searching for a peripheral device is input by a user, the time period consumed in searching for a peripheral device is reduced by 50%. If device information of an even greater proportion of peripheral devices is stored in the storage unit 130, the time period consumed in searching for a peripheral device is further reduced. When a distance moved by a Bluetooth device is not great and a Bluetooth device environment is not greatly changed, for example when a device remains within a building such as a home or office, if a request for searching for a peripheral device is input by a user, information about peripheral devices can be immediately provided to the user. The present invention can be characterized in that the mobile terminal can execute a rapid process of searching for peripheral Bluetooth devices. The present invention can be divided into the first and second embodiments in view that whether or not a position of the mobile terminal is considered when searching for peripheral Bluetooth devices. In the first embodiment of the present invention, the mobile terminal can execute a rapid search for peripheral Bluetooth devices without any consideration of the position of the mobile terminal. Therefore, a GPS system is not an indispensable element of the mobile terminal in the first embodiment of the present invention. However, in the second embodiment of the present invention, the mobile terminal may use the position of the mobile terminal in order to improve the reliability of the search for peripheral Bluetooth devices. Accordingly, as for the second embodiment for the present invention, a GPS system can be a needed element of the mobile terminal. However, the principles of the invention may be first disclosed sufficiently without the use of a GPS system and, it would be within the skill of a person in the art to include a GPS system to improve the position information.

After notifying the user of the acquired device information at step 335, or if no response message of the broadcast inquiry was received at step 315, the controller 120 determines whether a preset search time period has elapsed (340). The preset search time period is a time period preset as a sufficiently long period for receiving a response message transmitted from peripheral devices.

If a preset search time period has elapsed, termination of the requested search process is presented to the user (345). In this case, the method of notifying the user of the termination of the search process of the peripheral device may be executed with the same method as that of notifying the user of the presence of stored or detected/found device information. In the present embodiment described herein, termination of the requested search process is presented to the user with the same method as that of notifying the user of the detection of device information, i.e. displaying the information in the display unit 150. In this case, a method of displaying termination of a search process to a user through the display unit 150 is performed by displaying termination of the search process in a portion of a screen of the display unit 150 and displaying the device information acquired at step 330 in the remaining portion of the screen of the display unit 150. Further, step 345 of notifying the user of termination of a search process may be omitted according to a user setting.

If a device address included in a received response message does not exist in the peripheral device list in storage unit 130 (FIG. 1) at step 325, the controller 120 performs a process of acquiring a device name of the peripheral device that transmitted the response message (350). The process of acquiring a device name is performed by transmitting a message requesting information about the peripheral device and receiving a response message including device information of the slave device as a response message of the message requesting information about the peripheral device, as previously described. In this case, the device name response message includes slave device information, such as a peripheral device name and support service information.

The controller 120 determines whether device information is acquired from the received device name response message (355). If device information is acquired from the received device name response message, the process continues at step 335 and the controller 120 notifies the user of the acquired device information. If device information is not acquired from the received device name response message, the process continues at step 340 and the controller 120 determines whether a preset search time period has elapsed.

Thereby, by using information about peripheral devices that was previously searched and stored, when a request for searching for a peripheral device is input by a user, information about peripheral devices can be rapidly provided to the user.

Figure 4:
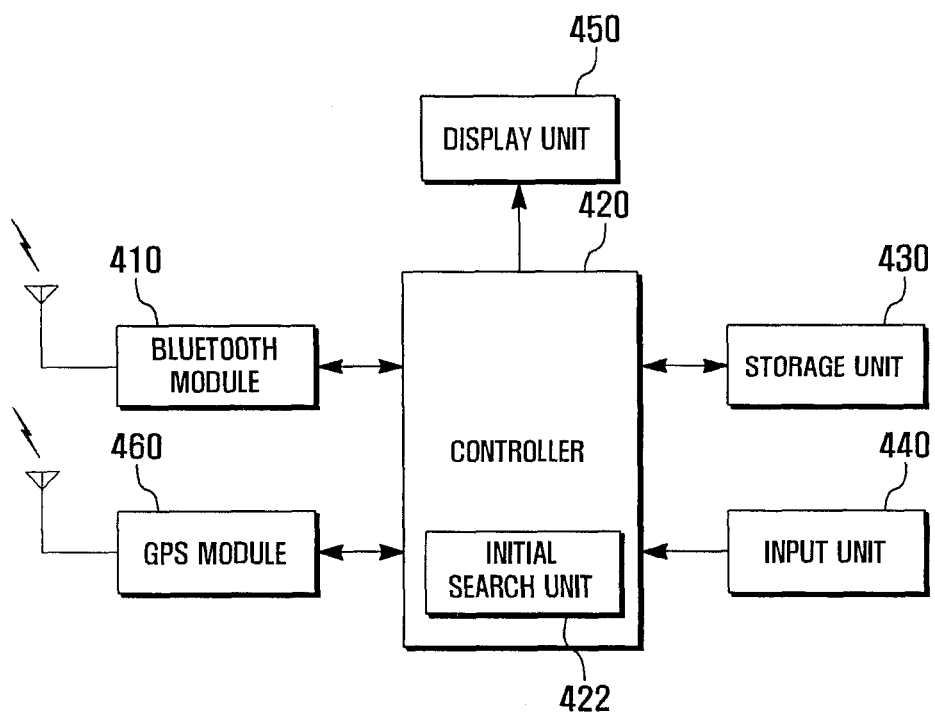
FIG. 4 is a block diagram illustrating a configuration of a device with a Bluetooth module according to another exemplary embodiment of the present invention.

FIG. 4 is a block diagram illustrating a configuration of a Bluetooth device according to another embodiment of the present invention.

In the present exemplary embodiment, a Bluetooth device includes a Bluetooth module and transmits and receives a signal for Bluetooth communication through the Bluetooth module. The Bluetooth device further includes a position calculation unit of the Bluetooth device. FIG. 4 illustrates a case of using a Global Positioning System (hereinafter, 'GPS') module as a position information module for determining a position of a Bluetooth device.

Referring to FIG. 4, the Bluetooth device includes a Bluetooth module 410, controller 420, storage unit 430, input unit 440, display unit 450, and GPS module 460.

The Bluetooth module 410 performs Bluetooth communication by transmitting and receiving signals to and from a peripheral device, as described with reference to FIG. 1. Particularly, when a request for searching for a peripheral device is input according to the present exemplary embodiment, the Bluetooth module 410 broadcasts an inquiry message in accordance with a known radio frequency hopping channels for performing Bluetooth communication and transmits a request message of device name information. Further, the Bluetooth module 410 receives a response message of the inquiry message and of the device name information request message transmitted from the Bluetooth devices that received the message.

The controller 420 controls general operations of the Bluetooth device. Further, the controller 420 includes an initial search unit 422, and when an input for an initial search of a peripheral device is received, such as when power is applied to the Bluetooth device, or when a request for activating the Bluetooth module 410 is input, the controller 420 controls the initial search unit 422 to perform operations for searching for peripheral devices according to a corresponding condition and to store information about the detected peripheral devices in the storage unit 430. The process for performing an initial search is described in detail later with reference to FIGS. 5 and 6.

The storage unit 430 stores various programs and data executed and processed by the control of the controller 420. Further, the storage unit 430 may also store previously acquired information regarding peripheral Bluetooth devices and position information of the Bluetooth device according to the present embodiment of the invention.

The input unit 440 is used for inputting a user's manipulation signal for controlling operation of the Bluetooth device. The input unit 440 may have a plurality of keys (not shown) for performing an input operation.

The display unit 450 visually displays information related to a state and operation of the Bluetooth device. In the present embodiment, the display unit 450 displays information about peripheral devices acquired in a process of searching for peripheral devices. In the present embodiment, the input unit 440 and the display unit 450 are separately illustrated. However the input unit 440 and the display unit 450 may be provided in a single device, for example a touch screen.

The GPS module 460 determines position information of the Bluetooth device from GPS satellites using well-known position determination algorithms. The device position is determined by calculating distances between the Bluetooth device and a plurality of satellites using signals received from the satellites through the GPS module 460 and position information of the satellites. A method of determining a device position using signals received from GPS satellites is well known and therefore a detailed description thereof is not provided herein.

FIG. 4 illustrates a case of determining Bluetooth device position using signals received from GPS satellites. However, the position of the Bluetooth device can be acquired with other known methods, For example, using a signal received from a mobile communication station without receiving a signal from a GPS satellite, or using data received from a position determination entity (PDE) provided within a network, as in a mobile station (MS) based GPS.

Figure 5:
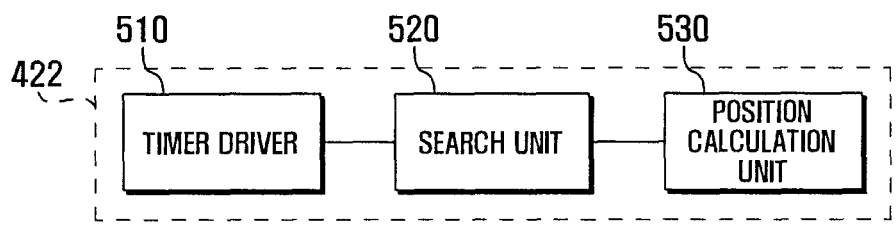
FIG. 5 is a block diagram illustrating a configuration of an initial search unit of the device of FIG. 4.
Figure 6:
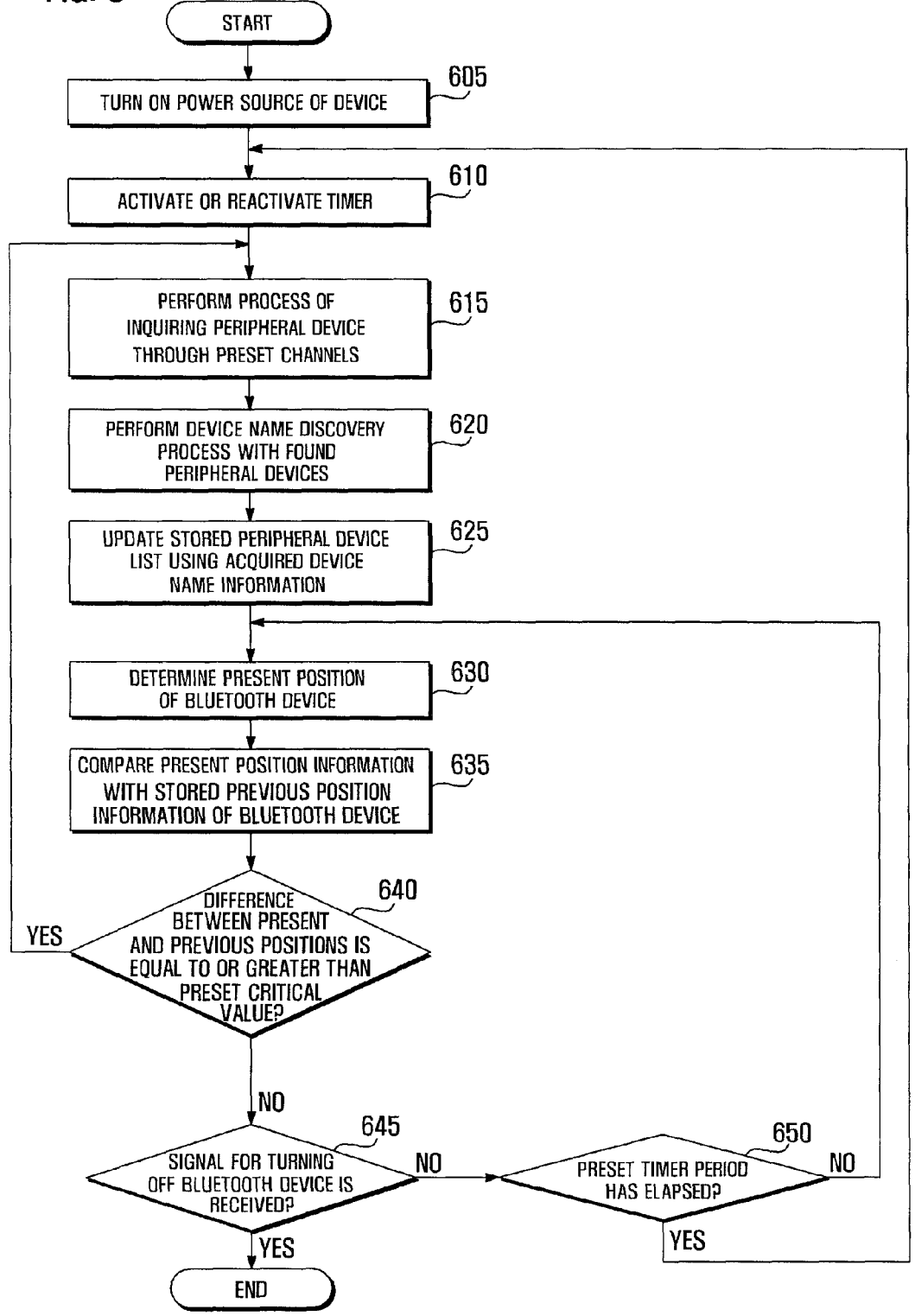
FIG. 6 is a flowchart illustrating a process of performing an initial search for peripheral devices according to an embodiment of the present invention.

FIG. 5 is a block diagram illustrating a configuration of the initial search unit 422 of the Bluetooth device of FIG. 4. FIG. 6 is a flowchart illustrating a process of performing an initial search for peripheral devices according to another exemplary embodiment of the present invention.

Referring to FIGS. 5 and 6, the initial search unit 422 includes a timer driver 510, search unit 520, and position calculation unit 530.

The initial search unit 422 determines that a power source of a Bluetooth device is turned on, i.e. that power is applied to the Bluetooth device (605).

FIG. 6 illustrates a process of performing an initial search for a peripheral device in a preset period from a time point at which power is applied to the Bluetooth device, similar to that shown and discussed with regard to FIG. 2. However, in order to save power consumption of the Bluetooth device, the initial search of the peripheral device may only be performed when a preset input, such as input for activating the Bluetooth module 410 to perform an initial search for a peripheral device, is performed.

In either case, the timer driver 510 activates or reactivates a timer set to be activated for an appropriate preset time period to perform an initial search for peripheral devices. The timer driver also enables the search unit 520 to perform another initial search for a peripheral device by notifying termination of the timer time period to the search unit 520 when the timer has elapsed.

The timer driver 510 activates the timer that is set to be activated for a preset time period in order to measure an initial search period (610).

The search unit 520 performs a process of inquiring peripheral devices available for performing Bluetooth communication through preset frequency channels (615).

The process of inquiring peripheral devices includes a process of broadcasting an inquiry message and a process of receiving a response message of the inquiry message, as previously described with reference to FIG. 2.

The search unit 520 thereby acquires address information of peripheral devices included in an inquiry response message received through the inquiry process, for example, a device address and clock information of a transmitting slave device.

The search unit 520 performs a device name discovery process with the peripheral devices that transmitted an inquiry response message (620). The device name discovery process is performed by transmitting a message requesting information about the peripheral device and receiving a response message including information about the peripheral device, as described with reference to FIG. 2. Because the device name response message includes information about a peripheral device that transmitted an inquiry response message, the search unit 520 acquires a device name and support service information of peripheral devices existing in within a signal receiving area of the Bluetooth device. Device name information can be set during the manufacturing process, or by a user as a name of the peripheral Bluetooth device. Support service information is information about a service that can be supported by the peripheral device, and includes information about which services are supported (e.g., communication using a headset, printing, and transmission and reception of a still picture file, moving picture file, or music file). For convenience of description, a process of determining whether address information of a peripheral device acquired through an inquiry process already exists in a stored list prior to performing step 620 is omitted, however such a process may be performed. If such a process is performed, the device name discovery process of step 620 is performed only with peripheral Bluetooth devices in which address information does not exist in the stored list.

The search unit 520 stores information about peripheral devices in a peripheral device list using the acquired device name information (625). Whenever an initial search of the peripheral device is periodically performed by the search unit 520, the stored peripheral device list is updated. As an initial search of the peripheral device is performed, information about peripheral devices stored in the peripheral device list can be easily updated according to various situations, such as movement of a master device or a slave device and termination of Bluetooth communication between a master device and one or more of the slave devices. Therefore, in order to sustain a peripheral device list having high reliability, the search unit 520 compares information of the peripheral device acquired by performing an initial search of the peripheral device with previously stored information of the peripheral device in the peripheral device list and updates the stored information. However, instead of updating the information of the peripheral device whenever an initial search of the peripheral device is performed, the information may be updated only after the expiration of a predetermined time period, or only if received information is determined to be critical information according to at least one or more criterion (criteria) value(s). Further, when no new device information is acquired from a peripheral device, the corresponding device information may be deleted from the peripheral device list.

The position calculation unit 530 determines a present position of the Bluetooth device using information received from the GPS module 460 of FIG. 4 (630).

The position calculation unit 530 compares the newly determined present position information with stored previous position information of the Bluetooth device (635). In this case, the position calculation unit 530 compares the present position information of the Bluetooth device with the stored position information, and updates and stores the present position information in the storage unit 430, whereby in a subsequent process of comparing a subsequent position of the Bluetooth device, the present position information is used as previous position information.

The position calculation unit 530 determines whether the difference between the present and previous positions is equal to or greater than a preset critical value (640). If the difference between the present and previous positions is equal to or greater than a preset critical value, the process returns to step 615 and the search unit 520 performs a new process of inquiring peripheral devices. The critical value is a preset value at which the Bluetooth device is considered to have moved a sufficient distance to justify input of a request to perform a new search for peripheral devices in consideration of a communication range of the Bluetooth device. When the difference between the present and previous positions is equal to or greater than the preset critical value, i.e. when the Bluetooth device has moved a sufficient distance to input a request for re-searching for peripheral devices, the position calculation unit 530 enables the search unit 520 to perform an inquiry process by transmitting a signal to the search unit 520. Referring to the step 640 in FIG. 6, if the distance between present and previous position of the mobile terminal is greater than a preset critical value, the steps 615 to 640 would be repeated. During this repletion of steps 615 to 640, the step of updating (step 625) would be executed. As previously disclosed, during this step of updating, the device information can be deleted from the device list when no new device information is acquired from a peripheral device.

If the difference between the present and previous positions is less than a preset critical value, the search unit 520 determines whether a signal for turning off the Bluetooth device is received (645). If a signal for turning off the Bluetooth device is received, the search unit 520 terminates the initial search of the peripheral device. If a signal for turning off the Bluetooth device is not received, the timer driver 510 determines whether the preset timer period measured by the timer activated at step 610 has elapsed (650). Here, an initial search of the peripheral device is started when power of the Bluetooth device is turned on at step 605 and periodically performed thereafter, until turning off a power source to the Bluetooth device is determined. However, when the start of an initial search of the peripheral device is activated by a differently set function, the initial search is periodically performed until turning off of the setting function is determined. For example, when an initial search of the peripheral device starts by input for turning on Bluetooth module driving, the search unit 520 determines whether input for turning off Bluetooth module driving is received.

If the preset time period has elapsed, the process returns to step 610 and the timer is reactivated. If the preset time period has not elapsed, the process returns to step 630.

By performing an initial search of a peripheral device in this manner, after storing information about found peripheral devices, if a request to search for a peripheral device available to perform Bluetooth communication is input by a user, information about already found peripheral devices is rapidly provided to the user by the method described with reference to FIG. 3.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, according to the present invention, after information about peripheral devices is stored by performing an initial search for a peripheral device, if a request for searching for a peripheral device is input by a user, information about peripheral devices can be rapidly provided to the user. Therefore, when searching for peripheral devices, a time period consumed in acquiring information about peripheral devices can be significantly reduced, and when a request for searching for a peripheral device is input, by rapidly providing information about the peripheral devices, user convenience can be improved.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A method, operable in a Bluetooth device, for searching for a peripheral Bluetooth device, comprising:
    detecting an input instructing the start of a pre-search;
    acquiring an initial search address information and an initial search device information about at least one peripheral Bluetooth device in a preset time period through preset channels in which the preset time period is a value set as a time interval in which a state of the at least one peripheral Bluetooth device changes states from a standby state to a wakeup state;

storing a peripheral Bluetooth device list using the acquired initial search address information and initial search device information in a storage unit;

detecting an input requesting a search for a peripheral device that performs Bluetooth communication;

acquiring address information of a found peripheral Bluetooth device through the preset channels;

determining whether address information exists in the storage unit that corresponds to the acquired address information of the found peripheral Bluetooth device; and updating the peripheral Bluetooth device list by adding the acquired address information of the found peripheral Bluetooth device when said acquired address information does not exist in the storage unit, or deleting from the peripheral Bluetooth device list address information of the found peripheral Bluetooth device, when address information of the found peripheral Bluetooth device exists in the storage unit and no new address information is acquired that causes update of the address information in the storage unit of the found peripheral Bluetooth device, wherein the updating of the peripheral Bluetooth device list occurs only after expiration of the present time period, or when receive initial search device information is determined to be critical information according to one or more preset criterion values; and notifying a user that the stored initial search device information of the found peripheral device corresponds to the address information of the found Bluetooth peripheral device, after determining that address information exists in the storage unit that corresponds to the acquired address information of the found peripheral Bluetooth device.

2. The method of claim 1, further comprising:
when the particular address information of the found peripheral Bluetooth device does not exist in the storage unit, acquiring device information of the found peripheral Bluetooth device corresponding to address information from among the acquired address information received from the found peripheral Bluetooth device; and notifying a user of the acquired device information of the found Bluetooth peripheral device that corresponding to address information that does not exist in the storage unit.

3. The method of claim 1 further comprising:
determining, a current position of the peripheral Bluetooth device using the initial search address information and the initial search device information;

comparing the determined current position of the peripheral Bluetooth device with a previous position of the peripheral Bluetooth device that was previously determined and stored on the peripheral device list; and wherein the initial search address information and initial search device information about the peripheral Bluetooth device is acquired when a difference between the current position and the previous position of the Bluetooth device is equal to or greater than a critical value, and when a difference between the current position and the previous position of the Bluetooth device is less than a critical value, acquiring device information of the found peripheral Bluetooth device corresponding to address information from among the acquired address information received from the found peripheral Bluetooth device.

4. The method of claim 1, wherein acquiring initial search address information comprises:

broadcasting an inquiry message while frequency hopping among a plurality of preset channels; and receiving a response message including the initial search address information in response to the inquiry message.

5. The method of claim 1, wherein acquiring address information comprises:

broadcasting an inquiry message while frequency hopping among a plurality of preset channels; and receiving a response message including the address information in response to the inquiry message.

6. The method of claim 1, wherein acquiring initial search device information comprises:

transmitting a remote name request to the at least one peripheral device corresponding to the acquired initial search address information; and receiving a response message including the initial search device information in response to the remote name request.

7. The method of claim 2, wherein acquiring device information comprises:

transmitting a remote name request to the peripheral device corresponding to the acquired address information; and receiving a response message including the device information in response to the remote name request.

8. The method of claim 1, wherein the initial search device information and the device information comprise at least one of: name information and support service information of the corresponding peripheral device.

9. The method of claim 1, wherein the input instructing the start of an initial search comprises at least one of: input for turning on a power source to the Bluetooth device and input for activating an initial search function of the Bluetooth device.

10. The method of claim 1, wherein storing the acquired initial search address information and initial search device information in a storage unit comprises:

updating previously stored initial search address information and initial search device information of the corresponding peripheral device with the search address information and initial search device information acquired in the preset period.

11. A Bluetooth device, comprising:
a Bluetooth module for transmitting and receiving signals for acquiring address information and device information of at least one peripheral device through present channels in a preset time period according to a Bluetooth communication protocol in which the preset time period is a value set as a time interval in which a state of the at least one peripheral device changes states from a standby state to a wakeup state;

a storage unit for storing a peripheral device list using the acquired address information and device information; and a controller for acquiring, if an input instructing the start of an initial search is received, initial search address information and initial search device information of at least one peripheral device in a preset period, acquiring, if a request for searching for a peripheral device for performing Bluetooth communication is a user input, address information of a found peripheral device, determining whether address information corresponding to acquired address information associated with said found peripheral devices exists in the storage unit, the controller updates the peripheral Bluetooth device list by adding the acquired address information of the found peripheral device when said acquired address information does not exist in the storage unit, or deleting from the peripheral Bluetooth device list address information of the found peripheral device, when address information of the found peripheral device exists in the storage unit and no new address information is acquired in which the controller is configured for updating of the peripheral Bluetooth device list occurs only after expiration of the preset time period, or when the controller determines that the received initial search device information is determined to be critical information according to one or more present criterion values, notifies a user, if said address information corresponding to the acquired address information of said found peripheral devices exists in the storage unit, of device information of the at least one peripheral device corresponding to the address information.

12. The Bluetooth device of claim 11, wherein the controller acquires device information of a found peripheral Bluetooth device corresponding to address information among the acquired address information that does not exist in the storage unit, and notifies a user of the acquired device information.

13. The Bluetooth device of claim 11, further comprising a position information module for receiving one of: position information and information from which position information may be determined.

14. The Bluetooth device of claim 13, wherein the controller determines a current position of the Bluetooth device using the initial search address information and the initial search device information received through the position information module, compares the determined current position with a previous position that was previously determined and stored on the peripheral device list, and acquires, when the difference between the current position and the previous position is equal to or greater than a critical value, initial search address information and initial search device information about at least one peripheral Bluetooth device through the Bluetooth communication protocol; and
   when a difference between the current position and the previous position of the Bluetooth device is less than a critical value, acquiring device information of the found peripheral Bluetooth device corresponding to address information from among the acquired address information received from the found peripheral Bluetooth device.

15. The Bluetooth device of claim 11, wherein the Bluetooth module broadcasts an inquiry message while frequency hopping among a plurality of preset channels associated with the Bluetooth communication protocol and receives a response message including the address information in response to the inquiry message.

16. The Bluetooth device of claim 11, wherein the Bluetooth module transmits a remote name request to the at least one peripheral device corresponding to the acquired address information and receives a response message including the device information in response to the remote name request.

17. The Bluetooth device of claim 11, wherein the device information comprises at least one of: name information and support service information of the corresponding peripheral device.

18. The Bluetooth device of claim 11, wherein the input instructing the start of an initial search comprises at least one of input for turning on a power source of the Bluetooth device and input for activating an initial search function of the Bluetooth device.

19. The Bluetooth device of claim 11, further comprising:
   an input unit for receiving input instructing the start of an initial search and for receiving input of a request for searching for the peripheral Bluetooth device.

20. The Bluetooth device of claim 11, wherein the storage unit updates previously stored address information and device information of the corresponding peripheral device with the address information and device information acquired in the preset period.

21. The Bluetooth device of claim 11, further comprising:
   a display unit for displaying device information of a found peripheral device corresponding to the acquired address information in order to notify a user.

* * * * *

UNITED STATES PATENT AND TRADEMARK OFFICE
CERTIFICATE OF CORRECTION

PATENT NO. : 8,897,703 B2
APPLICATION NO. : 12/546116
DATED : November 25, 2014
INVENTOR(S) : Sang Wook Park Page 1 of 1

It is certified that error appears in the above-identified patent and that said Letters Patent is hereby corrected as shown below:

In the Claims

Column 13, Claim 1, Lines 10-11 should read as follows:
--...Bluetooth device; updating the...--

Signed and Sealed this
Tenth Day of March, 2015

Michelle K. Lee
*Deputy Director of the United States Patent and Trademark Office*